United States Patent Office 3,637,721
Patented Jan. 25, 1972

3,637,721
PROCESS FOR PRODUCING ALDEHYDES BY OZONIZING AND REDUCING CERTAIN AROMATIC AND HETEROCYCLIC COMPOUNDS CONTAINING CARBON-TO-CARBON UNSATURATION
James J. Pappas, Parsippany, and William P. Keaveney, Pequannock, N.J., assignors to Inmont Corporation, Clifton, N.J.
No Drawing. Continuation-in-part of application Ser. No. 543,079, Apr. 18, 1966. This application June 25, 1970, Ser. No. 49,971
Int. Cl. C07d 31/32; C07c 47/52, 47/54
U.S. Cl. 260—297 R
9 Claims

ABSTRACT OF THE DISCLOSURE

An improved process for producing carbonyl compounds as products of the ozonization and reduction of organic compounds having carbon-to-carbon unsaturation which comprises ozonizing the unsaturated compound in a participating solvent and, as the improvement, reducing the hydroperoxide derivative formed thereby with a sulfide to convert to the carbonyl compound.

RELATED APPLICATIONS

This application is a continuation-in-part of our copending application Ser. No. 543,079, filed Apr. 18, 1966, now abandoned and assigned to the assignee of the instant application.

The present invention is directed to a process for reducing carbonyl compounds as products of the ozonization and reduction of organic compounds having carbon-to-carbon unsaturation.

Ozonization of such organic compounds in participating solvents results in the formation of carbonyl derivatives together with more highly oxidized derivatives of the organic compounds treated. The mixture of reaction products obtained is commonly reduced to obtain the neutral carbonyl fragments. This reduction involves a number of problems. Compounds subject to ozonization often contain additional functional groups; requiring that the reduction be specific. Reduction should be effective at relatively low temperatures. Requirements for reductants in such systems are discussed in U.S. Pat. 3,145,232. Of the many reducing agents disclosed, catalytic hydrogenation, reduction with metal-acid combinations, and reductions with acidified iodide ions have been most widely utilized. Other reductants, such as sodium bisulfite, stannous chloride, Raney nickel, formaldehyde, sulphur dioxide, and trialkyl phosphites, have been disclosed.

The reaction mixture, after ozonization in a participating solvent from which, e.g., an alkoxy or acyloxy group may be obtained, commonly contains hydroperoxy derivatives, with both substituents being bonded to a terminal carbon atom of the fragment. This hydroperoxy derivative may be the predominant reaction product. A reducing agent, to be effective in such mixtures, must be specific to reduction at these hydroperoxy functional groups.

While these reducing agents have performed satisfactorily in the instant process, there have been certain disadvantages inherent in their use. Thus, for example, potassium iodide reductions must be conducted in the presence of acid thereby limiting its general applicability. Furthermore, when a potassium iodideacetic acid reducing system is utilized with naphthalene, the naphthalene ozonolysis mixture undergoes acid catalyzed decomposition of the hydroperoxide species rather than the desired reduction reaction. With trialkyl phosphite reducing agents, some difficulty is encountered in isolating the free aldehyde from the reaction mix. Such trialkyl phosphites are also highly susceptible to hydrolysis and therefore the reduction reaction must be conducted in anhydrous media. Sodium bisulfite reducing agents are limited by their minimum solubility in organic reagents and the need for maintaining certain pH levels when utilized in water. In addition, it forms bisulfite addition compounds with carbonyl functions, thereby complicating the isolation of the free carbonyl compound. Zinc-acetic acid systems are effective only at room temperature or above. The acetic acid component causes some decomposition of the hydroperoxide function and therefore the system is not preferred for reduction of labile hydroperoxides. Finally, the yields obtained by utilizing catalytic hydrogenation of the ozonolysis mixture are extremely sensitive to changes in the process variables such as pressure, temperature, solvent and catalyst.

It is an object of the present invention to provide an improved ozonization-reduction process for producing carbonyl compounds.

Other objects and advantages of the present invention will in part be obvious and will in part become apparent from the description herein.

The present invention provides an ozonization-reduction process for producing carbonyl derivatives of a wide variety of organic compounds containing carbon-to-carbon unsaturation (double bonds) by first ozonizing the unsaturated compound in a participating solvent, followed by addition to the reaction mixture of a sulfide reducing agent having the formula RSR', wherein R and R' are selected from the groups consisting of alkyl, alkenyl, aryl, aralkyl, and alkaryl. It is contemplated that for most purposes, the sulfide will be those in which the alkyl, and alkenyl groups, and the aliphatic portions of the aralkyl and alkaryl groups, will contain up to 20 carbon atoms and preferably contain 1 to 18 atoms; the aryl groups, and the aryl portion of the aralkyl and alkaryl groups are preferably monocyclic aryls. The R and R' groups may be bridged to form a cyclic compound. This cyclic compound may also include a second sulphur atom. Illustrative compounds include methylethyl sulfide, diethyl sulfide, dioctadecyl sulfide, methylphenyl sulfide, diphenyl sulfide, tetrahydrothiophene and dithiane. The preferred reducing agents are diphenyl sulfide, methylphenyl sulfide, and alkyl sulfides containing 1 to 18 carbon atoms such as dimethyl sulfide, diethyl sulfide, ethylpropyl sulfide, dioctadecyl sulfide and tetrahydrothiophene.

It is to be noted that in contrast to the prior art reducing agents, these sulfides provide reasonable reduction at low temperatures; can be used in the presence of either acid or base; are hydrolytically stable; can be easily recovered if present in excess; are extremely selective in that they do not produce further reduction of the carbonyl function and they do not effect substituent groups present on the unsaturated compound; and, provide excellent yields of carbonyl derivatives.

A virtually unlimited number of organic compounds having carbon-to-carbon unsaturation are applicable for use in this novel process. Among such unsaturated compounds are included: alkenes such as butene, 1-pentene; 1-octene and 1-dodecene; cycloalkenes such as cyclohexene; styrenes such as styrene, alpha-methyl styrene and 4-nitrosostyrene; naphthalenes; phenanthrenes; indenes; isosafrole; olefinic fatty acids such as oleic and linoleic acids; vinyl compounds such as vinyl propionate and 2- or 4-vinyl pyridine; alpha, beta-unsaturated carboxylic acids such as maleic, fumaric, crotonic, itaconic and citraconic acids; and the mono- and dialkyl esters of alpha, beta-unsaturated dicarboxylic acids such as mono and diethyl maleate; dimethyl maleate, mono and dibutyl maleate and the corresponding fumarates, itaconates and citraconates.

The ozonization may be a batch or a continuous process. It is commonly carried out by passing a stream of oxygen containing ozone through a solution of an unsaturated organic compound in a participating solvent. Theoretically one mole of ozone is required per mole of unsaturation treated. Experimentally, it has been found that the reaction usually utilized between about 0.9 and 1.1 moles of ozone per mole of organic compound. The reaction is preferably carried out at low temperatures to obtain highest yields. Temperatures below about 50° C. are suitable and those below about 25° C. to about −70° C. are preferred.

The solvents utilized are participating solvents which have substantially no reaction with ozone relative to the substrate under the ozonization conditions. These are generally the protonic solvents, such as the hydroxylic solvents from which alkoxy or acyloxy groups are derived. The preferred solvents are alkyl alcohols, glycols, and aliphatic carboxylic acids containing 1 to 12 carbons, e.g. methanol, ethanol, propanol, isopropanol, butanol, hexyl alcohol, decanol, ethylene glycol, diethylene glycol, formic acid, acetic acid and the like. These solvents may be used alone or admixed with such common inert ozonization solvents as water, acetone, hexane, methyl chloride, methylene chloride, chloroform, carbon tetrachloride, ethyl chloride, ether, tetrahydrafuran, and acetonitrile.

The participating solvent enters into the reaction. The predominant product of the ozonolysis of phenanthrene in methanol is

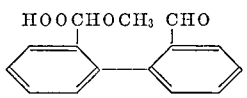

As a general rule, when the unsaturated carbon-to-carbon bond is broken, one of the new split carbon atoms contains a carbonyl functional group and the other hydroperoxy-alkoxy, e.g., hydroperoxy-methoxy group. When the unsaturated organic compound is split into two fragments by the ozonization, each of the aforesaid atoms is in a separate derivative. It is the usual function of the reducing agent, acting at the carbon atom containing the hydroperoxy-methoxy group, to reduce the hydroperoxy-methoxy group to a carbonyl group. The sulfide reducing agents utilized in the present invention cause this reduction to occur in high yield, without concomitantly affecting other functional groups on the compound. It has been found that when ozonizing maleic acid, followed by reduction with dimethyl sulfide, high yields of glyoxylic acid are obtained. However, when treating the diesters of maleic acid and of fumaric acid, the predominant product after reduction, is the corresponding ester of glyoxylic acid. With these esters, the reducing agent acts to reduce the hydroperoxy group to the hydroxy group, and does not split off the methoxy group.

The products formed from the ozonization-reduction process may be recovered from mixtures of reaction products by common separatory techniques, such as distillation, extraction, crystallization, etc. Where such techniques are relatively difficult, the desired product is often obtained by converting it to solid condensation products utilizing known reagents such as 2,4-dinitrophenylhydrazine, 4-nitrophenylhydrazine, semicarbazide, and hydroxylamine. Dimethyl sulfoxide, which is the oxidation product of dimethyl sulfide, is water soluble and may be recovered from the mixture of reaction products by admixture with water and subsequent recovery from the aqueous fraction. It may also be advantageously recovered from reaction mixtures by direct distillation, dependent upon the differential from the boiling points of the products. In the reductions of naphthalene and phenanthrene with dimethyl sulfide, the aldehyde product formed a complex with the dimethyl sulfoxide. Treatment with hydrochloric acid freed the aldehyde. Dimethyl sulfoxide is readily recovered in high yields from mixtures of water with such solvents as petroleum ether, ethyl ether, benzene, etc. These high yields are also obtained in the presence of various aldehydes.

The invention is further illustrated in the following examples. The ozonization in each of the examples was carried out in a conventional laboratory ozonization apparatus consisting of a reactor equipped with a stirrer, appropriate gas inlets and exits, cooling means, etc. The apparatus used is described in "Organic Ozone Reactions and Techniques" Maggiolo, page 22, 1962 edition, Welsbach Corporation. The ozonization gas is oxygen from an ozone generator, carrying ozone which is formed in the generator by an electric discharge.

EXAMPLE 1.—NAPHTHALENE 2.56 grams (0.02 mole) of naphthalene in 75 milliliters of methanol was ozonized by a flow of 1 liter per minute of oxygen containing 70.1 milligrams of ozone per liter of gas until two molar equivalents of ozone had been absorbed, at a temperature between −65° C. and −70° C. The apparatus was then purged with nitrogen and 10 milliliters of dimethyl sulfide added. This solution was kept at −10° C. for one hour and then at room temperature for one-half hour. The solvents were removed under vacuum. The residue was extracted with diethyl ether, then washed with water, and the diethyl ether fraction converted to the bis-2,4-dinitrophenylhydrazone. A 68% yield of o-phthalaldehyde was determined. A high yield of glyoxal (as the 2,4-dinitrophenylhydrazone) was determined from the water fraction. Naphthalene was similarly ozonized in a formic acid-methylene chloride solvent.

EXAMPLE II.—PHENANTHRENE 3.56 grams (0.02 mole) of phenanthrene dissolved in 60 milliliters of methanol was ozonized at −40° C. by passing 1 liter per minute of gas containing 74.4 milligrams ozone per liter, through the solution, for thirty minutes. The apparatus was then flushed with nitrogen and 5 milliliters (0.068 mole) of dimethyl sulfide added. This solution was stirred at −20° C. for one hour and then at 10° C. for two hours. The solvent was removed and the residue treated with 20 milliliters of 2 N hydrochloric acid on a steam bath for 15 minutes. Upon cooling, the mixture was made basic with excess sodium bicarbonate, and extracted with ether for a 91% yield of 2,2-biphenyldicarboxaldehyde.

EXAMPLE III.—STYRENE 10.41 grams (0.1 mole) of styrene was dissolved in 80 milliliters of methanol and ozonized. Ozonized oxygen containing 65.7 milligrams of ozone per liter of gas was passed at the rate of 1 liter per minute for 73 minutes at −70° C. The apparatus was then flushed with nitrogen and 10 milliliters (0.136 mole) of dimethyl sulfide added. The temperature was held at −10° C. for a half hour and then was allowed to reach room temperature. The solvent was stripped and the residue worked up to yield 89% benzaldehyde. A 75% yield of dimethyl sulfoxide was obtained from the aqueous phase.

Styrene was ozonized and reduced following the foregoing procedure, using other sulfide reductants with the results noted in the following table:

| | Percent yield | |
|---|---|---|
| Sulfide | Benzaldehyde | Sulfoxide |
| Dioctadecyl sulfide | 86 | 95 |
| Methylphenyl sulfide | 82 | 88 |
| Diphenyl sulfide | 60 | 51 |

It was observed that the relative rate of reduction decreased from dimethyl sulfide to dioctadecyl sulfide to methylphenyl sulfide to diphenyl sulfide.

EXAMPLE IV.—ISOSAFROLE 6.49 grams (0.04 mole) of isosafrole in 60 milliliters of methanol was ozonized at −40° C. by passing 1 liter per minute of an oxygen stream, containing 75.4 milligrams of ozone per liter, for 25 minutes and 36 seconds. The apparatus was flushed with nitrogen and 4.4 milliliters (0.06 mole) of dimethyl sulfide added, and the solution allowed to warm to room temperature. The solvent was removed and the residue worked up to obtain a 96% yield of piperonal.

EXAMPLE V.—4-VINYLPYRIDINE 10.51 grams (0.1 mole) of 4-vinylpyridine dissolved in 75 milliliters of methanol was ozonized at −65 to −70° C. by passing 1 liter per minute of oxygen containing 69.6 milligrams of ozone per liter of gas, for 68.9 minutes. The apparatus was then flushed with nitrogen and 10 milliliters (0.136 mole) of dimethyl sulfide added. The solution was allowed to stand at 2° C. for 16 hours. The methanol was removed and the residue extracted with diethyl ether and a saturated sodium chloride solution. The product was worked up yielding 80% of 4-pyridinecarboxaldehyde.

EXAMPLE VI.—4-NITROSTYRENE 7.46 grams (0.05 mole) of 4-nitrostyrene dissolved in 40 milliliters of methanol and 50 milliliters of methylene chloride was treated at −50° C. with 1 liter per minute of oxygen, containing 71.4 milligrams of ozone per liter, for 34 minutes. The apparatus was flushed with nitrogen and 5 milliliters (0.068 mole) of dimethyl sulfide added. The solution was kept at 2° C. for two hours and then brought to room temperature for ½ hour. The solvents were removed and 80 milliliters of water added, cooled in ice bath and filtered to yield 97% of 4-nitrobenzaldehyde.

EXAMPLE VII.—INDENE 2.32 grams (0.02 mole) of indene dissolved in 75 milliliters of methanol was ozonized at −60° C. for 14 minutes with 1 liter per minute of oxygen containing 68.3 mg. of ozone per liter. The apparatus was flushed with nitrogen and 5 milliliters of dimethyl sulfide added at −70° C. The Dry Ice was then replaced by an ice bath and the reaction agitated for 2 hours. The excess dimethyl sulfide was removed under vacuum and the methanol solution diluted and worked up with 4-nitrophenylhydrazine obtaining a 70% yield of homophthalaldehyde (as the hydrazone).

EXAMPLE VIII.—CYCLOHEXENE 8.21 grams (0.1 mole) of cyclohexene, dissolved in 75 milliliters of methanol and cooled to −60° C., was ozonized by passing 1 liter per minute of oxygen, containing 69.6 milligrams of ozone per liter, for 69 minutes until one molar equivalent of ozone had been absorbed. The apparatus was swept with nitrogen and 10 milliliters of dimethyl sulfide added. This solution was maintained at −10° C. for one hour and at 25° C. for a half hour. The methanol was removed and the remainder of the reaction mixture worked up to yield 62% adipaldehyde.

EXAMPLE IX.—1-OCTENE 11.2 grams (0.1 mole) of 1-octene dissolved in 75 milliliters of methanol, at −30° C., was ozonized, with 1 liter per minute of oxygen containing 66.7 milligrams of ozone per liter, for 71 minutes and 57 seconds, a total of 4,800 milligrams of ozone. The temperature during the ozonization was gradually lowered to −60 C. The system was flushed with nitrogen and ten milliliters of dimethyl sulfide added. The solution was allowed to stand overnight in an ice water bath. The solvent was then stripped and the residue extracted with petroleum ether and water to obtain a 75% yield of n-heptaldehyde, and a 79% yield of dimethyl sulfoxide.

EXAMPLE X.—1-DODECENE 16.83 grams (0.1 mole) of 1-dodecene in 35 milliliters of methanol and 35 milliliters of methylene chloride were ozonized at −25° C. The oxygen flow of 1 liter per minute contained 67.5 milligrams of ozone per liter, and was continued for a period of 71 minutes and 6 seconds. The system was flushed with nitrogen and ten milliliters of dimethyl sulfide were added. The solution was maintained at room temperature for 2 hours. The solvent was stripped and the residue extracted with petroleum ether and water and worked up to yield 55% of n-undecylaldehyde. Dimethyl sulfoxide was obtained in an 85% yield from the aqueous layer.

EXAMPLE XI.—MALEIC ACID 2.5 grams (0.0215 mole) of maleic acid in 50 milliliters of methanol, at −50° C., were ozonized by passing 1 liter of oxygen per minute for a total of 74 minutes. Each liter of oxygen contained 20.6 milligrams of ozone. The system was then flushed with nitrogen and 2.4 milliliters (0.0326 mole) of dimethyl sulfide added. The solution was held at −10° C. for one hour, at 2° C. for one hour and at room temperature for one-half hour. The solvent was stripped and the product worked up to yield 91% of glyoxylic acid, recovered as the 2,4-dinitrophenylhydrazone.

Maleic acid was similarly subject to ozonation in the solvents and at the temperatures listed in the following table to obtain the indicated yields.

| Solvent | Temperature, °C. | Percent yield glyoxylic acid |
|---|---|---|
| Formic acid | 2 | 85 |
| Acetic acid (40 ml.) plus acetone (35 ml.) | −10 | 88 |
| Acetic acid (40 ml.) plus propionic acid (35 ml.) | −10 | 92 |
| Acetic acid (44 ml.) plus water (31 ml.) | −15 | 87 |
| 2-methoxyethanol | −20 | 82 |
| Methanol | 10 | 83 |
| Do | −50 | 91 |

EXAMPLE XII.—MALEIC ACID 2.5 grams of maleic acid in 75 milliliters of methanol were ozonized at −50° C. under the procedure of the preceding example. The system was flushed with nitrogen and 2.09 grams (0.0236 mole) of tetrahydrothiophene added. After the usual work-up, a yield of 87% of glyoxylic acid, as the 2,4-dinitrophenylhydrazone, was obtained.

EXAMPLE XIII.—DIETHYL FUMARATE 6.8 grams (0.0395 mole) of diethyl fumarate in 80 milliliters of methanol, at −20° C., was ozonized by passing 25.2 milligrams per liter of ozone in a total oxygen flow of 1 liter per minute for 80 minutes. The solution was gradually cooled to −65° C. during the ozonization, which continued for 8 minutes. Nitrogen was then used to flush the ozone, and 4 milliliters (0.54 mole) of dimethyl sulfide added. The solution was kept at 2° C. for 2 hours. The methanol was stripped under vacuum and the residue distilled to a total product yield of 87% of the methanol hemiacetal of ethyl glyoxylate. Dimethyl sulfoxide was also recovered in 78% yield.

EXAMPLE XIV.—DIETHYL MALEATE 13.78 g. (0.08 mole) of diethyl maleate in 80 milliliters of methanol, at −50° C., was ozonized with one liter per minute of oxygen, containing 22.9 milligrams per liter of ozone, until one molar equivalent of ozone was absorbed. The system was flushed with nitrogen and 8 milliliters (0.109 mole) of dimethyl sulfide added. The solution was maintained at 2° C. for one hour and at room temperature for one-half hour. The solvent was stripped and the residue distilled to give a total yield of 92% of ethyl glyoxylate as the methanol hemiacetal. The yield of dimethyl sulfoxide was 82%.

EXAMPLE XV.—DIMETHYL MALEATE 11.5 grams (0.08 mole) of dimethyl maleate in 75 milliliters of methanol were cooled to $-25°$ C., and during ozonization, gradually cooled to $-55°$ C. One liter per minute of oxygen containing 23.7 milligrams of ozone per liter of gas flowed until one molar equivalent of ozone was taken up. The system was flushed with nitrogen and 8 milliliters (1.109 mole) of dimethyl sulfide added. The solution was maintained for one hour at $2°$ C., and then at room temperature for one-half hour. The solvent was then stripped and the residue distilled to give a total product yield of 85% of the methanol hemiacetal of methyl glyoxylate. The yield of dimethyl sulfoxide was 89%. Similar results were obtained using tetrahydrothiophene in place of dimethyl sulfide, although a slightly slower rate of reduction was observed.

Examples XIII–XV indicate that the ozonization of the esters of maleic and fumaric acids result in substantial production of the glyoxylate ester hemiacetals. These generally have a normal boiling point range of about $125°$ C. to $135°$ C., resulting in ready separation from the higher boiling by-product, dimethyl sulfoxide, by distillation. It has been observed that the esters of maleic acid and fumaric acid ozonize more rapidly than do the corresponding acids.

As is apparent from the variety of reducing agents, solvents, and unsaturated organic compounds exemplified, the process of the invention is widely applicable to the reduction of ozonalysis products of compounds having unsaturated carbon-to-carbon bonds disclosed in the literature to be subject to ozonization, such as the alkenyl, and the aryl and heterocyclic organics exemplified. This process is also useful in related systems of commercial value such as the unsaturated fatty acid derivatives and other products of pharmaceutical interest, as plasticizers, perfumes, e.g. piperonal, solvents, dye stuffs, and reactants in chemical syntheses and polymerization reactions.

The process of the present invention results in obtention of the desired products in high yield. The products and also the sulfoxide oxidation derivative of the sulfide reducing agent, are readily isolated and recovered. When utilizing dimethyl sulfide, the corresponding sulfoxide, dimethyl sulfoxide is a more valuable chemical than the reagent and contributes to the overall economics of the process.

As many embodiments of this invention may be made without departing from the spirit and scope thereof, it is to be understood that the invention includes all such modifications and variations as come within the scope of the appended claims.

What is claimed is:

1. In a process for preparing a carbonyl derivative of a product resulting from the ozonization of an organic compound having carbon-to-carbon unsaturation selected from the group consisting of naphthalene, phenanthrene, indene, styrene, alpha-methyl styrene, 4-nitroso-styrene, 2- or 4-vinyl pyridine, said ozonization being carried out in the presence of a solvent selected from the group consisting of lower alkanols, glycols and acids containing 1 to 12 carbon atoms to obtain a hydroperoxy derivative of said organic compound, the improvement which comprises incorporating a reducing agent selected from the group consisting of dimethyl sulfide, di-octadecyl sulfide, methyl phenyl sulfide and diphenyl sulfide into said mixture, maintaining said mixture at a temperature of $-70°$ to $50°$ C. whereby the hydroperoxy group is reduced to a carbonyl group, and then separating the carbonyl compound from the mixture.

2. The process of claim 1, wherein said sulfide is dimethyl sulfide.

3. The process of claim 3, wherein said solvent is at least in part methanol and wherein said organic compound ozonized is naphthalene.

4. The process of claim 3 wherein said solvent is at least in part methanol and wherein said organic compound ozonized is phenanthrene.

5. The process of claim 3, wherein said solvent is at least in part methanol and wherein said organic compound ozonized is isosafrole.

6. The process of claim 3, wherein said solvent is at least in part methanol and wherein said organic compound ozonized is indene.

7. The process of claim 3, wherein said solvent is at least in part methanol and wherein said organic compound ozonized is styrene.

8. The process of claim 3, wherein said solvent is at least in part methanol and wherein said organic compound ozonized is 4-vinylpyridine.

9. The process of claim 3 in which the dimethyl sulfide is oxidized to dimethyl sulfoxide, wherein said dimethyl sulfoxide is recovered from the mixture of reaction products.

References Cited
UNITED STATES PATENTS

| | | | |
|---|---|---|---|
| 2,888,485 | 5/1959 | Bailey | 260—523 |
| 3,067,205 | 12/1962 | Callighan et al. | 260—607 |
| 3,145,232 | 8/1962 | Thompson | 260—483 X |

OTHER REFERENCES

Horner et al., Chem. Abstracts, vol. 51, pages 12879–80 (1957).

ALAN L. ROTMAN, Primary Examiner

U.S. Cl. X.R.

260—340.5, 406, 483, 484 R, 523 R, 533 R, 533 C, 598, 599, 601 R, 602, 554, 607 A